(12) United States Patent
Chu et al.

(10) Patent No.: US 7,194,655 B2
(45) Date of Patent: Mar. 20, 2007

(54) METHOD AND SYSTEM FOR AUTONOMOUSLY REBUILDING A FAILED SERVER AND A COMPUTER SYSTEM UTILIZING THE SAME

(75) Inventors: Simon C. Chu, Chapel Hill, NC (US); Richard A. Dayan, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 536 days.

(21) Appl. No.: 10/459,837

(22) Filed: Jun. 12, 2003

(65) Prior Publication Data

US 2004/0255189 A1 Dec. 16, 2004

(51) Int. Cl.
*G06F 11/00* (2006.01)

(52) U.S. Cl. .......................................................... 714/4
(58) Field of Classification Search .................... 714/7, 714/13, 4, 6
See application file for complete search history.

(56) References Cited

U.S. PATENT DOCUMENTS

| | | | |
|---|---|---|---|
| 4,710,926 A | | 12/1987 | Brown et al. |
| 4,987,529 A | * | 1/1991 | Craft et al. .................. 710/113 |
| 5,016,244 A | | 5/1991 | Massey, Jr. et al. |
| 5,021,938 A | * | 6/1991 | Hayakawa ....................... 700/3 |
| 5,157,663 A | * | 10/1992 | Major et al. ................... 714/10 |
| 5,212,784 A | * | 5/1993 | Sparks ............................ 714/6 |
| 5,495,569 A | | 2/1996 | Kotzur |
| 5,537,533 A | * | 7/1996 | Staheli et al. .................... 714/5 |
| 5,592,611 A | * | 1/1997 | Midgely et al. ................ 714/4 |
| 5,627,962 A | | 5/1997 | Goodrum et al. |
| 5,696,895 A | * | 12/1997 | Hemphill et al. ............... 714/4 |
| 5,777,874 A | * | 7/1998 | Flood et al. .................. 700/82 |
| 5,822,512 A | * | 10/1998 | Goodrum et al. ............. 714/13 |
| 5,938,732 A | * | 8/1999 | Lim et al. .................... 709/229 |
| 5,987,621 A | * | 11/1999 | Duso et al. ..................... 714/4 |
| 5,991,900 A | * | 11/1999 | Garnett ......................... 714/56 |
| 6,021,111 A | | 2/2000 | Soga |
| 6,029,189 A | * | 2/2000 | Ishida et al. ................. 718/105 |
| 6,108,300 A | | 8/2000 | Coile et al. |
| 6,144,999 A | * | 11/2000 | Khalidi et al. .............. 709/219 |
| 6,163,856 A | * | 12/2000 | Dion et al. ..................... 714/4 |
| 6,167,531 A | * | 12/2000 | Sliwinski ...................... 714/13 |
| 6,185,695 B1 | * | 2/2001 | Murphy et al. ................. 714/4 |
| 6,205,527 B1 | | 3/2001 | Goshey et al. |

(Continued)

FOREIGN PATENT DOCUMENTS

WO        WO09601533        11/1996

(Continued)

*Primary Examiner*—Bryce P. Bonzo
(74) *Attorney, Agent, or Firm*—Sawyer Law Group LLP

(57) ABSTRACT

A method and system for autonomously rebuilding a failed one of a plurality of servers and a computer system utilizing the same is disclosed. In a first aspect, the method comprises providing a bus for allowing a recovery mechanism to access each of the plurality of servers and utilizing the recovery mechanism to rebuild the failed server onto another server. In a second aspect, the computer system comprises a plurality of servers, a management module for monitoring and managing the plurality of servers, a recovery mechanism coupled to the management module, and a bus coupling the recovery mechanism to each of the plurality of servers, wherein the recovery mechanism rebuilds a failed server onto another of the plurality of servers.

38 Claims, 6 Drawing Sheets

U.S. PATENT DOCUMENTS

| | | |
|---|---|---|
| 6,260,158 B1 | 7/2001 | Purcell et al. |
| 6,269,431 B1 | 7/2001 | Dunham |
| 6,275,953 B1 | 8/2001 | Vahalia et al. |
| 6,285,656 B1 | 9/2001 | Chaganty et al. |
| 6,289,426 B1 | 9/2001 | Maffezzoni et al. |
| 6,292,905 B1 * | 9/2001 | Wallach et al. ............ 714/4 |
| 6,363,497 B1 * | 3/2002 | Chrabaszcz ............... 714/13 |
| 6,477,629 B1 | 11/2002 | Goshey et al. |
| 6,587,970 B1 * | 7/2003 | Wang et al. ............... 714/47 |
| 6,625,750 B1 * | 9/2003 | Duso et al. ............... 714/11 |
| 6,862,692 B2 * | 3/2005 | Ulrich et al. .............. 714/6 |
| 6,898,727 B1 * | 5/2005 | Wang et al. ............... 714/4 |
| 2001/0027491 A1 * | 10/2001 | Terretta et al. ........... 709/238 |
| 2001/0056554 A1 * | 12/2001 | Chrabaszcz ............... 714/13 |
| 2002/0021686 A1 * | 2/2002 | Ozluturk et al. .......... 370/342 |
| 2003/0005350 A1 * | 1/2003 | Koning et al. ............ 714/4 |
| 2003/0046602 A1 * | 3/2003 | Hino et al. ............... 714/4 |
| 2003/0135676 A1 * | 7/2003 | Jensen ..................... 710/107 |
| 2005/0010709 A1 * | 1/2005 | Davies et al. ............ 710/305 |

FOREIGN PATENT DOCUMENTS

| | | |
|---|---|---|
| WO | WO0198902 | 12/2001 |

* cited by examiner

METHOD AND SYSTEM FOR AUTONOMOUSLY REBUILDING A FAILED SERVER AND A COMPUTER SYSTEM UTILIZING THE SAME

FIELD OF THE INVENTION

The present invention relates generally to computer server systems and, more particularly, to a method and system for autonomously rebuilding a failed server onto another server.

BACKGROUND OF THE INVENTION

In today's environment, a computing system often includes several components, such as servers, hard drives, and other peripheral devices. These components are generally stored in racks. For a large company, the storage racks can number in the hundreds and occupy huge amounts of floor space. Also, because the components are generally free standing components, i.e., they are not integrated, resources such as floppy drives, keyboards and monitors, cannot be shared.

A system has been developed by International Business Machines Corp. of Armonk, N.Y., that bundles the computing system described above into a compact operational unit. The system is known as an IBM eServer BladeCenter.™ The BladeCenter is a 7U modular chassis that is capable of housing up to 14 individual server blades. A server blade or blade is a computer component that provides the processor, memory, hard disk storage and firmware of an industry standard server. Each blade can be "hot-plugged" into a slot in the chassis. The chassis also houses supporting resources such as power, switch, management and blower modules. Thus, the chassis allows the individual blades to share the supporting resources.

Currently in the BladeCenter environment, if one of the server blades fails, an administrator must intervene to identify the failing blade, and unplug, remove and replace it with a new blade. This alone is a cumbersome task. If the administrator further wishes to retain the application and data on the failed blade's hard drive, the administrator must physically remove the hard drive from the failed blade and remount it into the new blade. This process is labor intense, time consuming, and economically costly, particularly if the failed blade is located at a remote site.

Accordingly, a need exists for a system and method for rebuilding a failed blade onto another blade. The system and method should be autonomous, i.e. requiring no human intervention, and easily implemented. The present invention addresses such a need.

SUMMARY OF THE INVENTION

A method and system for autonomously rebuilding a failed one of a plurality of servers and a computer system utilizing the same is disclosed. In a first aspect, the method comprises providing a bus for allowing a recovery mechanism to access each of the plurality of servers and utilizing the recovery mechanism to rebuild the failed server onto another server. In a second aspect, the computer system comprises a plurality of servers, a management module for monitoring and managing the plurality of servers, a recovery mechanism coupled to the management module, and a bus coupling the recovery mechanism to each of the plurality of servers, wherein the recovery mechanism rebuilds a failed server onto another of the plurality of servers.

DETAILED DESCRIPTION

The present invention relates generally to server systems and, more particularly, to a method and system for autonomously rebuilding a failed server onto another server. The following description is presented to enable one of ordinary skill in the art to make and use the invention and is provided in the context of a patent application and its requirements. Although the preferred embodiment of the present invention will be described in the context of a BladeCenter, various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

According to a preferred embodiment of the present invention, a recovery mechanism rebuilds the hard drive of a failed server onto the hard drive of another server in response to the detection of the failed server. The recovery mechanism preferably utilizes a bus that provides access to each server and allows the data on the failed server's hard drive to be copied and transferred to a hard drive of another server. In a system and method in accordance with the present invention, the failed server is rebuilt promptly and without human intervention. An administrator no longer is required to physically remove and remount the hard drive, thereby saving time and cost. Thus, the downtime for the failed server is minimized and QoS is improved.

Figure 1:
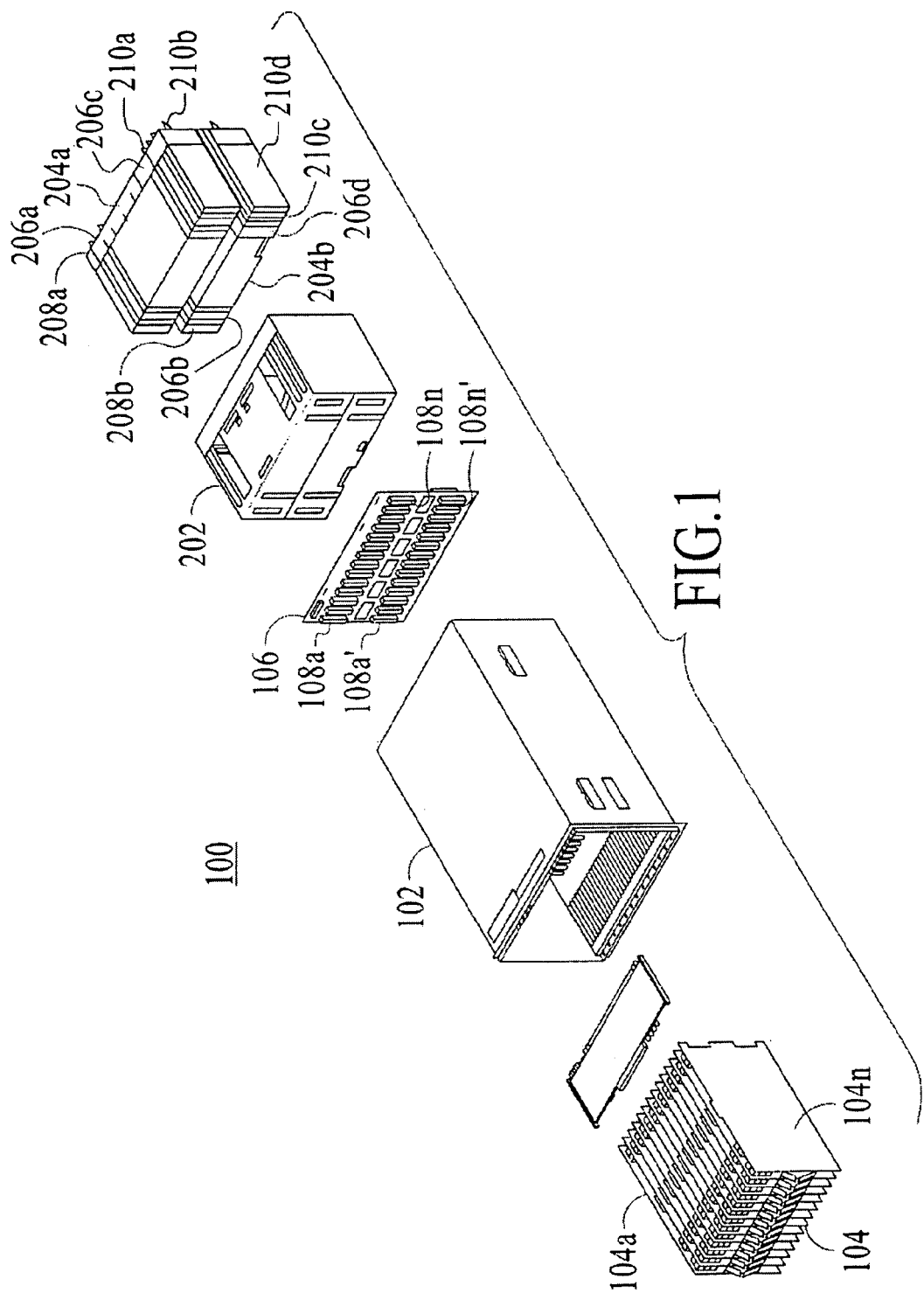
FIG. 1 is a perspective view illustrating the front portion of a BladeCenter.

To describe further the features of the present invention, please refer to the following discussion and Figures, which describe a computer system, such as the BladeCenter, that utilizes the preferred embodiment of the present invention. FIG. 1 is an exploded perspective view of the BladeCenter system 100. Referring to this figure, a main chassis 102 houses all the components of the system. Up to 14 server blades 104 (or other blades, such as storage blades) are plugged into the 14 slots in the front of chassis 102. Blades 104 may be "hot swapped" without affecting the operation of other blades 104 in the system 100. A server blade 104a can use any microprocessor technology so long as it is compliant with the mechanical and electrical interfaces, and the power and cooling requirements of the system 100.

A midplane circuit board 106 is positioned approximately in the middle of chassis 102 and includes two rows of connectors 108, 108'. Each one of the 14 slots includes one pair of midplane connectors, e.g., 108a, 108a', located one above the other, and each pair of midplane connectors, e.g., 108a, 108a' mates to a pair of connectors (not shown) at the rear edge of each server blade 104a.

Figure 2:
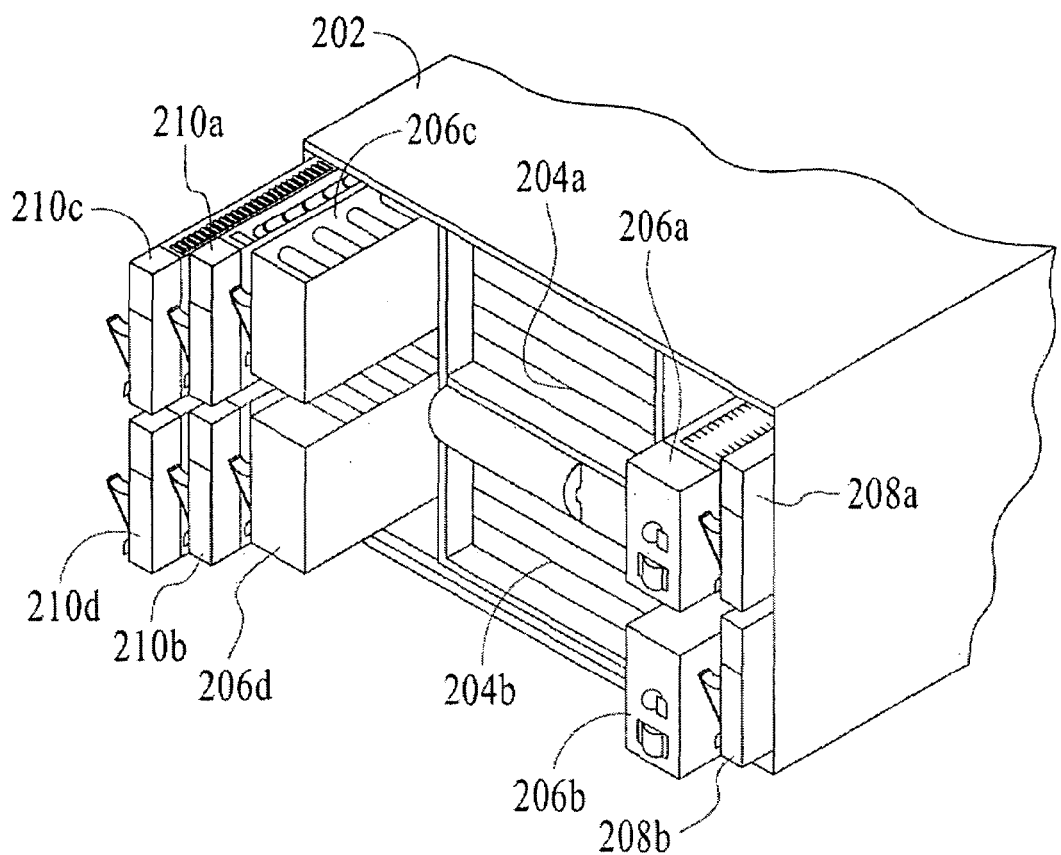
FIG. 2 is a perspective view of the rear portion of the BladeCenter.

FIG. 2 is a perspective view of the rear portion of the BladeCenter system 100, whereby similar components are identified with similar reference numerals. Referring to FIGS. 1 and 2, a second chassis 202 also houses various components for cooling, power, management and switching. The second chassis 202 slides and latches into the rear of main chassis 102.

As is shown in FIGS. 1 and 2, two optionally hot-plugable blowers 204a, 204b provide cooling to the blade system components. Four optionally hot-plugable power modules 206 provide power for the server blades and other components. Management modules MM1 and MM2 (208a, 208b) can be hot-plugable components that provide basic management functions such as controlling, monitoring, alerting, restarting and diagnostics. Management modules 208 also provide other functions required to manage shared resources, such as multiplexing the keyboard/video/mouse (KVM) to provide a local console for the individual blade servers 104 and configuring the system 100 and switching modules 210.

The management modules 208 communicate with all of the key components of the system 100 including the switch 210, power 206, and blower 204 modules as well as the blade servers 104 themselves. The management modules 208 detect the presence, absence, and condition of each of these components. When two management modules are installed, a first module, e.g., MM1 (208a), will assume the active management role, while the second module MM2 (208b) will serve as a standby module.

The second chassis 202 also houses up to four switching modules SM1 through SM4 (210a–210d). The primary purpose of the switch module is to provide interconnectivity between the server blades (104a–104n), management modules (208a, 208b) and the outside network infrastructure (not shown). Depending on the application, the external interfaces may be configured to meet a variety of requirements for bandwidth and function.

Figure 3:
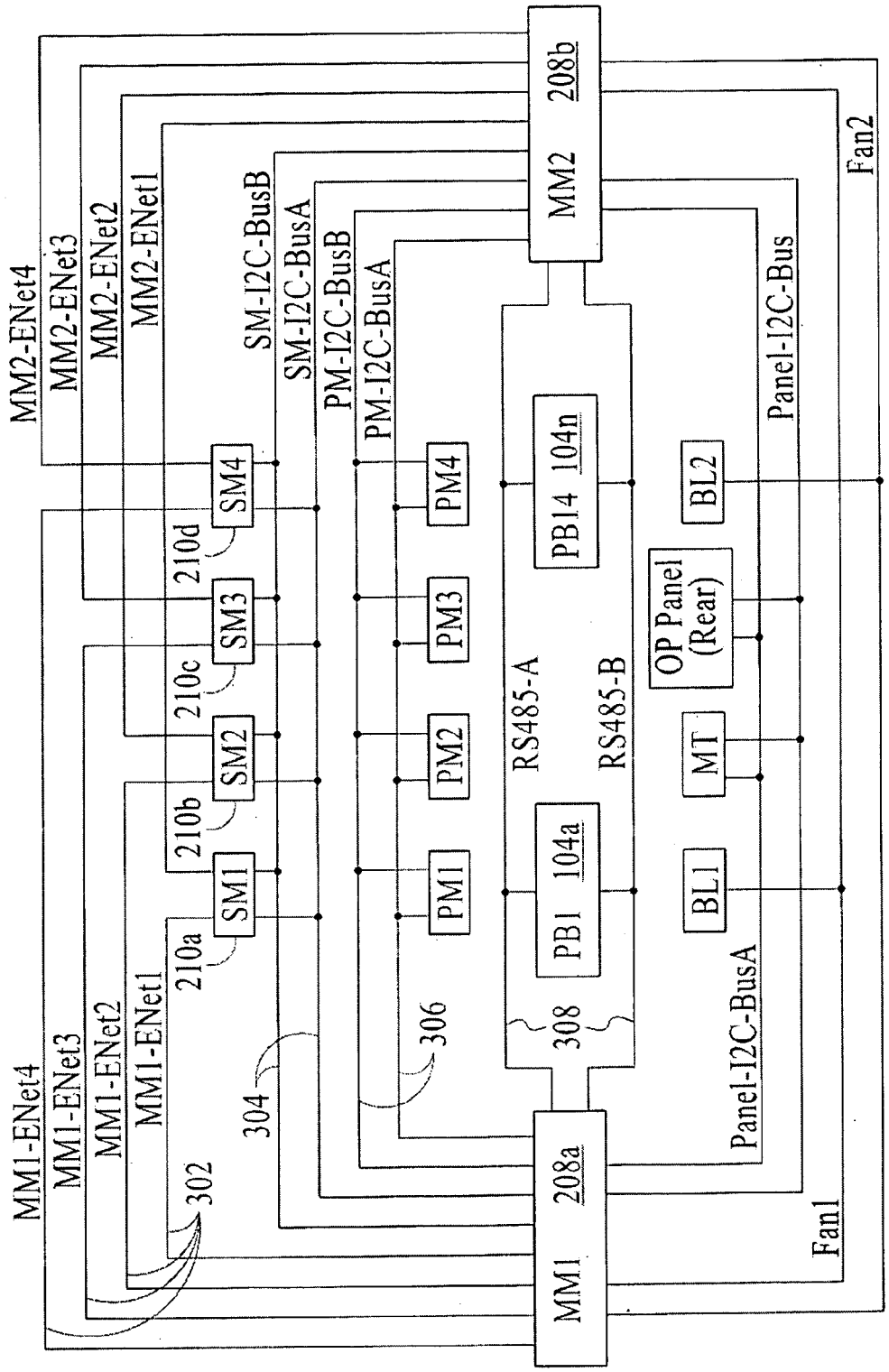
FIG. 3 is a schematic diagram of the Blade system's management subsystem.

FIG. 3 is a schematic diagram of the server blade system's management subsystem 300, where like components share like identifying numerals. Referring to this figure, each management module (208a, 208b) has a separate Ethernet link (302), e.g., MM1-Enet1, to each one of the switch modules (210a–210d). In addition, the management modules (208a, 208b) are coupled to the switch modules (210a–210d) via two serial I2C buses (304), which provide for "out-of-band" communication between the management modules (208a, 208b) and the switch modules (210a–210d). Two serial buses (308) are coupled to server blades PB1 through PB14 (104a–104n) for "out-of-band" communication between the management modules (208a, 208b) and the server blades (104a–104n).

Figure 4:
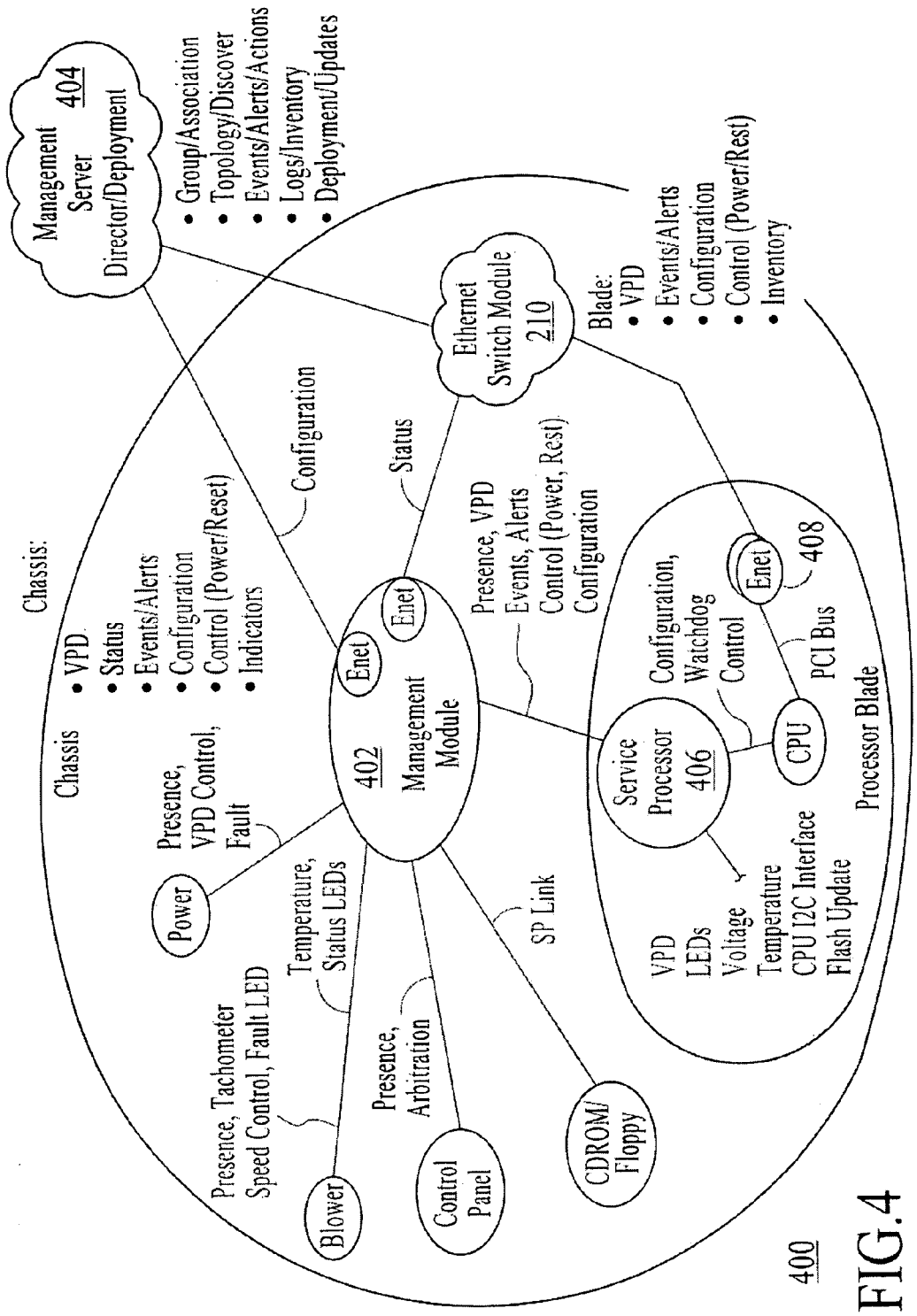
FIG. 4 is a topographical illustration of the Blade system's management functions.

FIG. 4 is a topographical illustration of the server blade system's management functions. Referring to FIGS. 3 and 4, each of the two management modules (208) has an Ethernet port 402 that is intended to be attached to a private, secure management server 404. The management module firmware supports a web browser interface for either direct or remote access. Each server blade (104) has a dedicated service processor 406 for sending and receiving commands to and from the management module 208. The data ports 408 that are associated with the switch modules 210 can be used to access the server blades 104 for image deployment and application management, but are not intended to provide chassis management services. The management module 208 can send alerts to a remote console, e.g., 404, to indicate changes in status, such as removal or insertion of a blade 104 or module. The management module 208 also provides access to the internal management ports of the switch modules 210 and to other major chassis subsystems (power, cooling, control panel, and media drives).

Referring again to FIGS. 3 and 4, the management module 208 communicates with each server blade service processor 406 via the out-of-band serial bus 308, with one management module 208 acting as the master and the server blade's service processor 406 acting as a slave. For redundancy, there are two serial busses 308 (one bus per midplane connector) to communicate with each server blade's service processor 406.

In general, the management module (208) can detect the presence, quantity, type, and revision level of each blade 104, power module 206, blower 204, and midplane 106 in the system, and can detect invalid or unsupported configurations. The management module (208) will retrieve and monitor critical information about the chassis 102 and blade servers (104a–104n), such as temperature, voltages, power supply, memory, fan and HDD status. If a problem is detected, the management module 208 can transmit a warning to a system administrator via the port 402 coupled to the management server 404. If the warning is related to a failing blade, e.g., 104a, the system administrator must replace the failed blade 104a. In order to preserve the information on the failed blade's 104a hard drive, the administrator must manually remove the hard drive and remount it into a replacement blade. This process is labor intensive and economically costly. The present invention resolves this problem.

Figure 5:
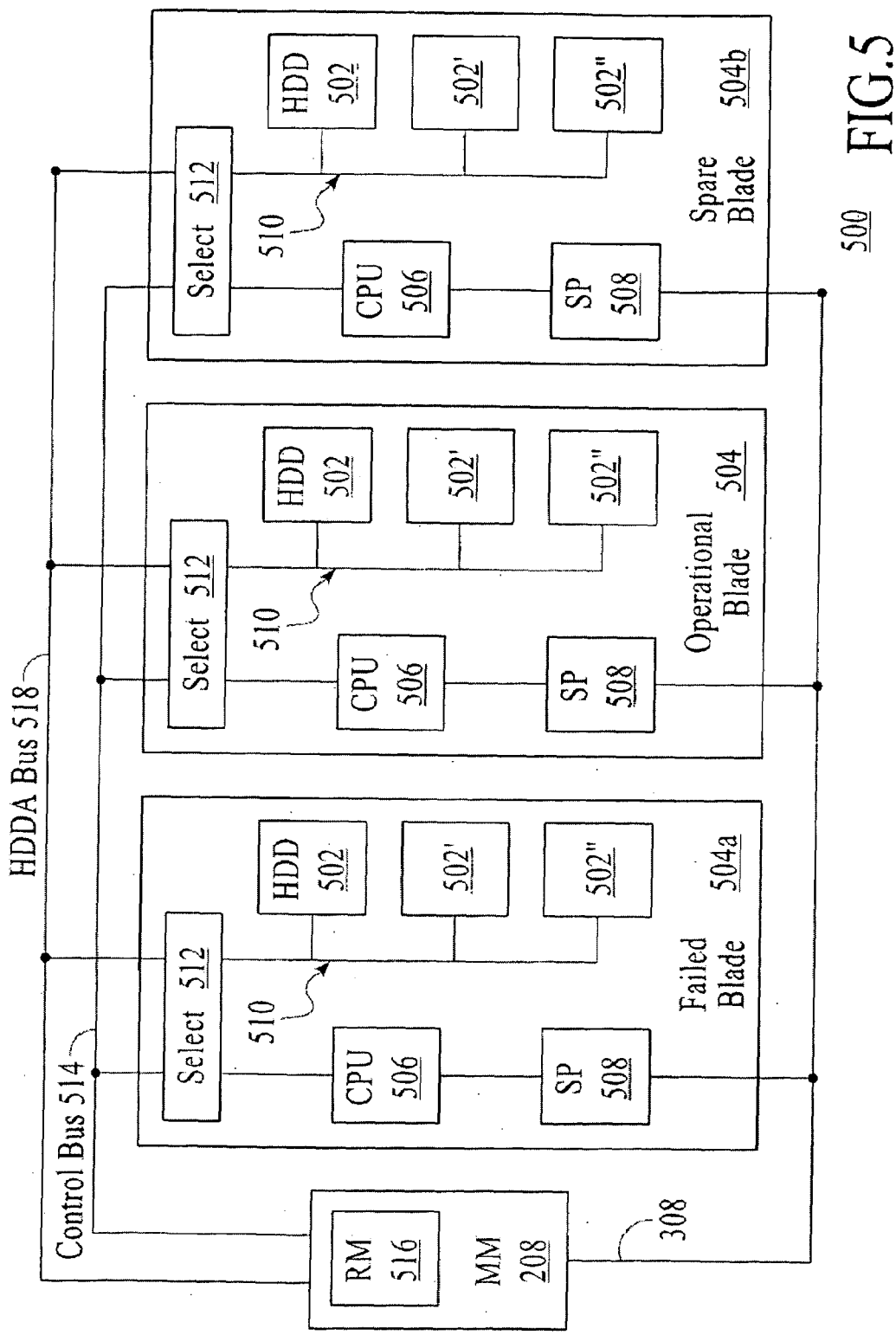
FIG. 5 is a schematic block diagram of the Blade system 500 according to a preferred embodiment of the present invention.

Please refer now to FIG. 5, which is a schematic block diagram of a blade system 500 according to a preferred embodiment of the present invention. For the sake of clarity, FIG. 5 depicts one management module 208 and three blades: a failed blade 504a, an operational blade 504 and a spare blade 504b. As is shown in FIG. 5, the failed blade 504a and the spare blade 504b are mounted in the same chassis (not shown). The system administrator (not shown) preferably uses the management module 208 to designate at least one blade to be the spare blade 504b.

The spare blade 504b is compatible with the blade type, in this case a server blade 504a, to which it has been designated as a spare. For example, within a chassis 102, several blade types, e.g., servers and storage blades, can be housed. The spare blade 504b for a server blade 504a will include system components compatible with those in the server blade 504a, i.e., the spare blade's hard drive 502 is compatible with the server blade's hard drive 502; whereas the spare blade for a storage blade will include system components compatible with those in the storage blade.

Each blade 504 includes a service processor 508 that is coupled to a central processing unit (CPU) 506. The management module 208 communicates with each blade's service processor 508 via the out-of-band serial bus 308. A standard IDE or SCSI interface bus 510 couples a plurality of peripheral devices 502, 502', 502'', such as the hard drive 502, to the CPU 506, via a select module 512. Preferably, the select module 512 directs traffic to and from the IDE or SCSI interface bus 510 in one of two directions, to the CPU 506 or to a hard-drive-direct access (HDDA) bus 518. As is shown, the HDDA bus 518 preferably provides direct access to the hard drive 502 of each of the blades 504, 504a, 504b.

According to a preferred embodiment of the present invention, a recovery mechanism 516 is coupled to the management module 208 and controls the select module 512 via a control bus 514. Therefore, the recovery mechanism 516 controls whether traffic on the SCSI bus 510 flows to the CPU 506 or to the HDDA bus 518. While the recovery mechanism 516 is preferably in the management module 208, it can also be a stand alone system coupled to the management module 208. Moreover, the functionality of the control bus 514 can be incorporated into the HDDA bus 518, as those skilled in the art would readily appreciate.

At power up and under normal conditions, e.g., when all blades 504 are operating, the recovery mechanism 516 disables the HDDA bus 518 so that each blade's processor 506 has exclusive access to its associated hard drive 502. If a blade 504a fails, however, the recovery mechanism 516 enables the HDDA bus 518, activates the select module 512 in the failed blade 504a and in the spare blade 504b, and copies data from the hard drive 502 of the failed blade 504a to the hard drive 502 of the designated spare blade 504b via the HDDA bus 518.

Figure 6:
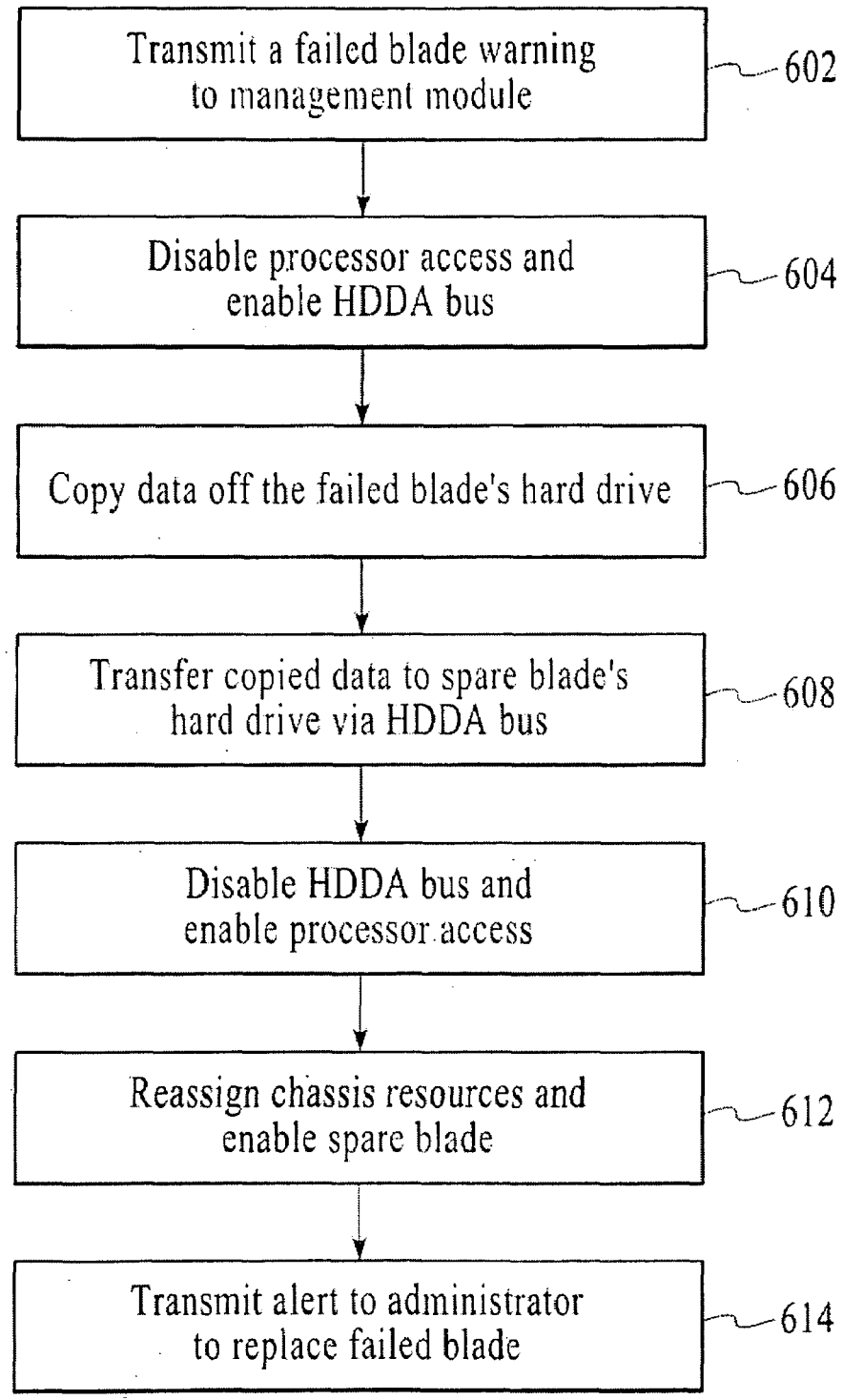
FIG. 6 is a flowchart illustrating a process for rebuilding a failed blade processor according to a preferred embodiment of the present invention.

FIG. 6 is a flowchart illustrating a process for rebuilding a failed blade processor according to a preferred embodiment of the present invention. If a failure occurs, the failed blade's 504a service processor 508 will issue a warning to the management module 208 in step 602. Once the management module 208 receives such a warning, it invokes the recovery mechanism 516, which disables the processor access to the hard drive 502 via the control bus 514 and enables the HDDA bus 518, via step 604. The recovery mechanism 516 now has direct access to the hard drive(s) 502 of the failed blade 504a. Once the HDDA bus 504 is enabled, the recovery mechanism 516 causes the data on the hard drive 502 of the failed blade 504a to be copied (in step 606) and transferred to the hard drive 502 of the spare blade 504b via the HDDA bus 504 in step 608. In a preferred embodiment, the entire hard drive content residing on the failed blade 504a is transferred to the spare blade 504b.

While the spare blade 504b can be an "extra" blade that becomes operational only when it "replaces" a failed blade 504a, it can also be a fully operational blade 504 in a server farm. Under such circumstances, the operational blade 504 can be taken off-line and used to replace the failed blade 504a if the quality of service (QoS) terms required by a user of the failed blade 504a requires another blade and the QoS terms of a user of the operational blade 504 allow the server farm administrator to degrade overall service to the operational blade 504 user.

Once the contents of the hard drive 502 of the failed blade 504a have been transferred to the spare blade 504b, the recovery mechanism 516 disables the HDDA bus 518 and restores processor 506 access to the hard drive 502 of the spare blade 504b via the control bus 514 (in step 610). At this point, the recovery mechanism 516 returns control to the management module 208, which then powers down the failed blade 504a. In step 612, the management module 208 reassigns any chassis resources, e.g., a virtual LAN, from the failed blade 504a to the spare blade 504b, and enables the spare blade 504b so that it can assume the failed blade's 504a identity and resume the same system operation. Finally, in step 614, the management module 208 can transmit an alert to the administrator that the failed blade 504a should be replaced. In a preferred embodiment, once the failed blade 504a is replaced with a new blade, that blade can be the designated spare blade 504b.

Through aspects of the present invention, a failed blade can be rebuilt onto another blade autonomously. Upon being notified of the failed blade, the recovery mechanism causes the entire contents of the hard drive of the failed blade to be transferred to the hard drive of the spare blade, which eventually assumes the identity of the failed blade. Because the failed blade is rebuilt promptly and without human intervention, the downtime for the failed blade is minimized and QoS is improved. The administrator no longer is required to physically remove and remount the hard drive, thereby saving time and cost.

While the preferred embodiment of the present invention has been described in the context of a BladeCenter environment, the functionality of the recovery mechanism 516 could be implemented in any computer environment where the servers are closely coupled. Thus, although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for rebuilding a failed one of a plurality of servers onto another of the plurality of servers comprising the steps of:
    (a) providing a bus for allowing a recovery mechanism to access each of the plurality of servers, wherein the bus is used only when one of the plurality of servers fails; and
    (b) the recovery mechanism utilizing the bus to rebuild the failed server onto the another server, wherein the failed server and the another server share a chassis.

2. The method of claim 1, wherein the providing step (a) further comprises the step of:
    coupling a hard drive in each of the plurality of servers to the bus via a select module in each of the plurality of servers, wherein the recovery mechanism is operable to control the select module in each of the plurality of servers.

3. The method of claim 2, wherein utilizing step (b) further comprises:
    (b1) disabling access to the hard drive in the failed server by a processor in the failed server; and
    (b2) enabling the bus, thereby allowing the recovery mechanism to have direct access to the hard drive of the failed server.

4. The method of claim 3, wherein the recovery mechanism performs the disabling step (b1) via a control line coupled to the select module in each of the plurality of servers.

5. The method of claim 4, wherein the select module controls access to the hard drive by the processor or by the bus.

6. The method of claim 3, wherein the utilizing step (b) further comprising the steps of:
    (b3) copying data from the failed server's hard drive; and
    (b4) transferring the copied data to the another server's hard drive across the bus.

7. The method of claim 6, wherein the entire contents of the failed server's hard drive is copied and transferred.

8. The method of claim 6, wherein the utilizing step (b) further comprising:
    (b5) disabling the bus; and
    (b6) enabling the processor in the another server to access the hard drive.

9. The method of claim 1, further comprising the step of:
    (c) enabling the another server to resume duties of the failed server.

10. The method of claim 9, wherein enabling step (c) further comprising:
    (c1) reassigning resources from the failed server to the another server; and (c2) allowing the another server to assume the identity of the failed server.

11. The method of claim 9, further comprising the steps of:
(d) powering down the failed server; and
(e) alerting an administrator of the failed server.

12. A computer readable medium containing program instructions for rebuilding a failed one of a plurality of servers onto another of the plurality of servers, the instructions for:
(a) providing a bus for allowing a recovery mechanism to access each of the plurality of servers, wherein the bus is used only when one of the plurality of servers fails; and
(b) the recovery mechanism utilizing the bus to rebuild the failed server onto the another server, wherein the failed server and the another server share a chassis.

13. The computer readable medium of claim 12, wherein the providing instruction (a) further comprises the instruction for:
coupling a hard drive in each of the plurality of servers to the bus via a select module in each of the plurality of servers, wherein the recovery mechanism is operable to control the select module in each of the plurality of servers.

14. The computer readable medium of claim 13, wherein the utilizing instruction (b) further comprises:
(b1) disabling access to the hard drive in the failed server by a processor in the failed server; and
(b2) enabling the bus, thereby allowing the recovery mechanism to have direct access to the hard drive of the failed server.

15. The computer readable medium of claim 14, wherein the recovery mechanism performs the disabling instruction (b1) via a control line coupled to the select module in each of the plurality of servers.

16. The computer readable medium of claim 15, wherein the select module controls access to the hard drive by the processor or the bus.

17. The computer readable medium of claim 14, wherein the utilizing instruction (b) further comprising the instructions for:
(b3) copying data from the failed server's hard drive; and
(b4) transferring the copied data to the another server's hard drive across the bus.

18. The computer readable medium of claim 17, wherein the entire contents of the failed server's hard drive is copied and transferred.

19. The computer readable medium of claim 17, wherein the utilizing instruction (b) further comprising:
(b5) disabling the bus; and
(b6) enabling the processor in the another server to access the hard drive.

20. The computer readable medium of claim 12, further comprising the instruction for:
(c) enabling the another server to resume duties of the failed server.

21. The computer readable medium of claim 20, wherein the enabling instruction (c) further comprising:
(c1) reassigning resources from the failed server to the another server; and
(c2) allowing the another server to assume the identity of the failed server.

22. The computer readable medium of claim 20, further comprising the instructions for:
(d) powering down the failed server; and
(e) alerting an administrator of the failed server.

23. A system for rebuilding a failed one of a plurality of servers onto another of the plurality of servers comprising:
a circuit board for coupling a recovery mechanism to the plurality of servers; and
a bus in the circuit board for allowing the recovery mechanism to access each of the plurality of servers, the bus being used only when one of the plurality of servers fails, wherein the recovery mechanism utilizes the bus to rebuild the failed server onto the another server, the failed server and the another server sharing a chassis.

24. The system of claim 23, wherein a hard drive in each of the plurality of servers is coupled to the bus via a select module in each of the plurality of servers, the recovery mechanism being operable to control the selected module in each of the plurality of servers.

25. The system of claim 24 further comprising:
means for disabling access by a processor in the failed server to the hard drive in the failed server; and
means for enabling and disabling the bus, wherein when the bus is enabled, the recovery mechanism has direct access to the hard drive of the failed server.

26. The system of claim 25, wherein the means for disabling/enabling access by the processor comprises a control line in the circuit board coupled to the select module in each of the plurality of servers, wherein the recovery mechanism utilizes the control line to activate the select module which controls access to the hard drive by the processor or by the bus.

27. The system of claim 25 further comprising:
means for copying data from the failed server's hard drive; and
means for transferring the copied data to the another server's hard drive across the bus.

28. The system of claim 23 further comprising:
means for enabling the another server to resume duties of the failed server.

29. The system of claim 23, wherein the another server is a spare server.

30. A computer system comprising:
a plurality of servers;
a management module for monitoring and managing the plurality of servers;
a recovery mechanism coupled to the management module; and
a bus coupling the recovery mechanism to each of the plurality of servers, the bus being used only when one of the plurality of servers fails, wherein the recovery mechanism utilizes the bus to rebuild a failed one of the plurality of servers onto another of the plurality of servers, the failed server and the another server sharing a chassis.

31. The system of claim 30, further comprising:
a control line coupling the recovery mechanism to a select module in each of the plurality of servers, the recovery mechanism being operable to control the select module in each of the plurality of servers, wherein the select module controls traffic on a peripheral device interface coupling the hard drive to the bus and to a processor in each server.

32. The system of claim 31, wherein the recovery mechanism utilizes the control line to direct the select module in the failed server and the select module in the another server to disable access by the processor in the failed server and access by the processor in the another server.

33. The system of claim 30, wherein a hard drive in each of the plurality of servers is coupled to the bus.

34. The system of claim 33, wherein the recovery mechanism copies data on the failed server's hard drive and transfers the copied data to the another server's hard drive across the bus.

35. The system of claim 30, wherein the recovery mechanism is in the management module.

36. A computer system comprising:
   a plurality of servers;
   a management module for monitoring and managing the plurality of servers;
   a recovery mechanism coupled to the management module;
   a bus coupling the recovery mechanism to a hard drive in each of the plurality of servers,
wherein the bus is used only when one of the plurality of servers fails;
   means for disabling access to the hard drive in a failed one of the plurality of servers by a processor in the failed server; and
   means for enabling the bus, wherein the recovery mechanism utilizes the bus to rebuild the failed server onto another of the plurality of servers, wherein the failed server and the another server share a chassis.

37. The computer system of claim 36, wherein the means for disabling access comprises:
   a control line coupling the recovery mechanism to a select module in each of the plurality of servers, the recovery mechanism being operable to control the select module in each of the plurality of servers, wherein the select module controls traffic on a peripheral device interface coupling the hard drive to the bus and to the processor.

38. The computer system of claim 37, wherein the recovery mechanism utilizes the control line to direct the select module in the failed server and the select module in the another server to disable access by the processor in the failed server and access by the processor in the another server.

* * * * *